US012767171B2

(12) United States Patent
Kumavat et al.

(10) Patent No.: US 12,767,171 B2
(45) **Date of Patent: *Oct. 20, 2026**

(54) METHOD AND SYSTEM FOR EXPANDING THE OPERATIONAL DESIGN DOMAIN OF AN AUTONOMOUS AGENT

(71) Applicant: Gatik AI Inc., Mountain View, CA (US)

(72) Inventors: Apeksha Kumavat, Palo Alto, CA (US); Arjun Narang, Palo Alto, CA (US); Gautam Narang, Palo Alto, CA (US); Engin Burak Anil, Palo Alto, CA (US)

(73) Assignee: Gatik Al Inc., Santa Clara, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 18/745,848

(22) Filed: Jun. 17, 2024

(65) Prior Publication Data

US 2024/0336279 A1 Oct. 10, 2024

Related U.S. Application Data

(63) Continuation of application No. 18/081,529, filed on Dec. 14, 2022, now Pat. No. 12,037,011.
(Continued)

(51) Int. Cl.
*B60W 60/00* (2020.01)
*G01C 21/34* (2006.01)

(52) U.S. Cl.
CPC ...... *B60W 60/001* (2020.02); *B60W 60/0011* (2020.02); *G01C 21/3461* (2013.01); *B60W 2552/53* (2020.02)

(58) Field of Classification Search
CPC ........... B60W 60/001; B60W 60/0011; B60W 50/0098; B60W 2552/53; B60W 2556/50;
(Continued)

(56) References Cited

U.S. PATENT DOCUMENTS 6,278,965 B1 8/2001 Glass et al.
6,292,830 B1 9/2001 Taylor et al.
(Continued)

FOREIGN PATENT DOCUMENTS

CN 113002540 A 6/2021
JP 2012531340 A 12/2012
(Continued)

OTHER PUBLICATIONS

"ApolloAuto/apollo Planning", GitHub, https://github.com/ApolloAuto/apollo/blob/master/modules/planning/README.md.
(Continued)

*Primary Examiner* — David P. Merlino
(74) *Attorney, Agent, or Firm* — Jeffrey Schox; Diana Lin

(57) ABSTRACT

A system for expanding the operational design domain (ODD) of an autonomous agent includes a decision-making platform (equivalently referred to herein as a decision-making architecture). A method for expanding the operational design domain (ODD) includes determining a decision-making architecture for a first domain and adapting the decision-making architecture to a second domain. Additionally or alternatively, the method 200 can include implementing the decision-making architecture S300 and/or any other processes.

14 Claims, 8 Drawing Sheets

Related U.S. Application Data

(60) Provisional application No. 63/316,108, filed on Mar. 3, 2022, provisional application No. 63/290,531, filed on Dec. 16, 2021.

(58) Field of Classification Search
CPC .. B60W 2050/0025; B60W 2050/0028; G01C 21/3461; G01C 21/3658
See application file for complete search history.

(56) References Cited

U.S. PATENT DOCUMENTS 7,230,545 B2 6/2007 Nath et al.
8,024,112 B2 9/2011 Krumm et al.
8,737,986 B2 5/2014 Rhoads et al.
9,507,346 B1 11/2016 Levinson et al.
10,106,153 B1 10/2018 Xiao et al.
10,311,336 B1 6/2019 Kim et al.
10,330,787 B2 6/2019 Melvin et al.
10,520,940 B2 12/2019 Palanisamy et al.
10,559,140 B2 2/2020 Nix et al.
10,860,022 B2 12/2020 Korchev et al.
10,866,588 B2 12/2020 Buch et al.
11,027,751 B2 6/2021 Wray et al.
11,034,364 B1 6/2021 Narang et al.
11,124,204 B1 9/2021 Narang et al.
11,157,010 B1 10/2021 Narang et al.
11,282,013 B2 3/2022 Rana et al.
11,294,387 B2 4/2022 Northcutt et al.
11,396,302 B2 7/2022 Ye et al.
11,454,970 B2 9/2022 Sujan et al.
11,468,395 B2 10/2022 Javidan et al.
11,491,979 B2 11/2022 Wang
11,521,396 B1 12/2022 Jain et al.
11,685,360 B2 6/2023 Frazzoli et al.
11,747,155 B2 9/2023 Wang et al.
11,753,008 B2 9/2023 Lin et al.
11,774,963 B2 10/2023 Huang et al.
11,789,456 B2 10/2023 Tan et al.
12,307,787 B2 * 5/2025 Jumonji ............... G06V 20/588
2008/0312833 A1 12/2008 Greene et al.
2009/0306866 A1 12/2009 Malikopoulos
2010/0131148 A1 5/2010 Camhi et al.
2012/0232733 A1 9/2012 Herbin et al.
2013/0274986 A1 10/2013 Trepagnier et al.
2015/0100530 A1 4/2015 Mnih et al.
2016/0161267 A1 6/2016 Harada
2016/0318515 A1 11/2016 Laur et al.
2017/0113686 A1 4/2017 Horita et al.
2017/0135621 A1 5/2017 Lee et al.
2017/0166204 A1 6/2017 Yoo et al.
2017/0345181 A1 11/2017 Yu et al.
2018/0188733 A1 7/2018 Iandola et al.
2018/0196439 A1 7/2018 Levinson et al.
2018/0232585 A1 8/2018 Kim
2018/0339709 A1 11/2018 Tiwari et al.
2019/0033085 A1 1/2019 Ogale et al.
2019/0035275 A1 1/2019 Nishi
2019/0084571 A1 3/2019 Zhu et al.
2019/0145784 A1 5/2019 Ma et al.
2019/0146492 A1 5/2019 Phillips et al.
2019/0146508 A1 5/2019 Dean et al.
2019/0147255 A1 5/2019 Homayounfar et al.
2019/0176843 A1 6/2019 Jones et al.
2019/0241198 A1 8/2019 Mori et al.
2019/0291720 A1 9/2019 Xiao et al.
2019/0311298 A1 10/2019 Kopp et al.
2019/0315351 A1 10/2019 Smith et al.
2019/0317496 A1 10/2019 Korchev et al.
2019/0329763 A1 10/2019 Sierra Gonzalez et al.
2019/0354101 A1 11/2019 Sujan et al.
2019/0361454 A1 11/2019 Zeng et al.
2019/0378019 A1 12/2019 Scheutz et al.
2020/0004259 A1 1/2020 Gulino et al.
2020/0010061 A1 1/2020 Tiwari et al.
2020/0026276 A1 1/2020 Zhang et al.
2020/0033855 A1 1/2020 Jammalamadaka et al.
2020/0033868 A1 1/2020 Palanisamy et al.
2020/0055515 A1 2/2020 Herman et al.
2020/0086862 A1 3/2020 Cui et al.
2020/0086863 A1 3/2020 Rosman et al.
2020/0133281 A1 4/2020 Gomez Gutierrez et al.
2020/0139975 A1 5/2020 Ishikawa et al.
2020/0143670 A1 5/2020 Kitani et al.
2020/0150672 A1 5/2020 Naghshvar et al.
2020/0174472 A1 6/2020 Zhang et al.
2020/0207339 A1 7/2020 Neil et al.
2020/0302322 A1 9/2020 Tukiainen et al.
2020/0326667 A1 10/2020 Ahuja et al.
2020/0356828 A1 11/2020 Palanisamy et al.
2020/0363800 A1 11/2020 Jojo-Verge et al.
2020/0385015 A1 12/2020 Tsuda
2021/0107498 A1 4/2021 Liu et al.
2021/0110484 A1 4/2021 Shalev-Shwartz et al.
2021/0117760 A1 4/2021 Krishnan et al.
2021/0179146 A1 6/2021 Nishida et al.
2021/0191407 A1 * 6/2021 Benisch ............... G05D 1/0221
2021/0201112 A1 7/2021 Gauthier et al.
2021/0255620 A1 8/2021 Bielby et al.
2021/0300405 A1 9/2021 Hyde et al.
2021/0304123 A1 9/2021 Vanapalli et al.
2021/0374502 A1 12/2021 Roth et al.
2021/0380132 A1 12/2021 Narang et al.
2021/0390353 A1 12/2021 Futatsugi et al.
2022/0001858 A1 1/2022 Futatsugi et al.
2022/0194426 A1 * 6/2022 Beaurepaire ........ B60W 30/085
2023/0177241 A1 6/2023 Hasenklever et al.
2023/0192126 A1 6/2023 Kumavat et al.
2023/0192139 A1 6/2023 Kumavat et al.

FOREIGN PATENT DOCUMENTS

JP 2015089801 A 5/2015
JP 2018205940 A 12/2018
JP 2019032174 A 2/2019
JP 2019055768 A 4/2019
JP 2019131141 A 8/2019
JP 2021176751 A 11/2021
WO 2011000714 A1 1/2011
WO 2017159176 A1 9/2017
WO 2018198823 A1 11/2018
WO 2019122952 A1 6/2019
WO 2019142276 A1 7/2019
WO 2020090251 A1 5/2020
WO 2020100408 A1 5/2020
WO 2020196086 A1 10/2020

OTHER PUBLICATIONS

"Learning to Drive in a Day", https://www.youtube.com/watch?v=eRwTbRtnT1I, Jul. 2, 2018.
"Learning to Drive in a Day", Wayve, in research, Jun. 28, 2018, https://wayve.ai/blog/learning-to-drive-in-a-day-with-reinforcement-learning/.
Cui, J. , "A review on safety failures, security attacks, and available countermeasures for autonomous vehicles", Nov. 13, 2018; https://pureportal.coventry.ac.uk/en/publications/a-review-on-safety-failures-security-attacks-and-available-counte.
Dabboussi, Abdallah , "Dependability approaches for mobile environment: Application on connected autonomous vehicles", Diss. University Bourgogne Franche-Comté, 2019, submitted Mar. 12, 2020.
Grimmet, Hugo , et al., "Integrating Metric and Semantic Maps for Vision-Only Automated Parking", 2015 IEEE International Conference on Robotics and Automation (ICRA), Washington State Convention Center, Seattle, Washington, May 26-30, 2015.
Guibas, Leonidas J., et al., "Bounded Uncertainty Roadmaps for Path Planning", In Proc. Int. Workshop on the Algorithmic Foundations of Robotics, 2008.
Karmakar, Gour , et al., "Assessing Trust Level of a Driverless Car Using Deep Learning", IEEE Transactions of Intelligent Transportation Systems, vol. 22, No. 7, Jul. 2021.

(56) References Cited

OTHER PUBLICATIONS

Kendall, Alex , et al., “Learning to Drive in a Day”, arXiv:1807.00412v2, Sep. 11, 2011.
Kuwata, Yoshiaki , et al., “Real-Time Motion Planning With Applications to Autonomous Urban Driving”, IEEE Transactions on Control Systems Technology, vol. 17, No. 5, Sep. 1, 2009.
Liu, Liangkai , et al., “Computing Systems for Autonomous Driving: State-of-the-Art and Challenges”, Dec. 7, 2020 ; https://arxiv.org/abs/2009.14349.
Loquercio, Antonio , et al., “A General Framework for Uncertainty Estimation in Deep Learning”, IEEE Robotics and Automation Letters PP(99):1-1, Feb. 2020.
Rastgoftar, Hossein , et al., “A Data-Driven Approach for Autonomous Motion Planning and Control in Off-Road Driving Scenarios”, 2018 American Control Conference (ACC), IEEE, 2018, May 2018.
Schwarting, Wilko , et al., “Planning and Decision-Making for Autonomous Vehicles”, Annual Review of Control, Robotics, and Autonomous Systems, Jan. 12, 2018, pp. 187-210.
Wu, Chien-Hsun , “Mechatronics and Remote Driving Control of the Drive-by-Wire for a Go Kart”, Feb. 23, 2020; https://www.mdpi.com/1424-8220/20/4/1216.

* cited by examiner

100

METHOD AND SYSTEM FOR EXPANDING THE OPERATIONAL DESIGN DOMAIN OF AN AUTONOMOUS AGENT

CROSS-REFERENCE TO RELATED APPLICATIONS

This application is a continuation of U.S. application Ser. No. 18/081,529, filed 14 Dec. 2022, and claims the benefit of U.S. Provisional Application No. 63/290,531, filed 16 Dec. 2021, and U.S. Provisional Application No. 63/316,108, filed 3 Mar. 2022, each of which is incorporated in its entirety by this reference.

TECHNICAL FIELD

This invention relates generally to the autonomous vehicle field, and more specifically to a new and useful system and method for expanding the operational design domain of an autonomous agent in the autonomous vehicle field.

BACKGROUND

Making safe and effective decisions in a self-driving vehicle is a difficult task. This type of decision making requires understanding of the current environment around the vehicle, the evolution of this environment into the future, and the safe and continuous progress towards the predefined driving goal. All decisions have to be continuously constrained by both driving rules of the road and human driving conventions—this combined with the immense number of possible interactions makes decision making a highly complex, difficult problem for autonomous systems. Even if a decision-making system is able to be put in place, when scaling the domain of deployment, the decision-making systems in conventional systems generalize poorly, which can lead to poor performance of the vehicle, reliability issues, and safety risks. A conventional approach to mitigate this problem is to re-collect a large amount of labeled or partly labeled data, which have the same distribution as the test data, and then train a machine learning model on the new data. However, many factors prevent easy access to such data, leading to high annotation costs, increased time-to-market, and limited domain scaling, among other limitations.

Thus, there is a need in the autonomous vehicle field to create an improved and useful system and method for expanding the operational design domain of an autonomous agent in the autonomous vehicle field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
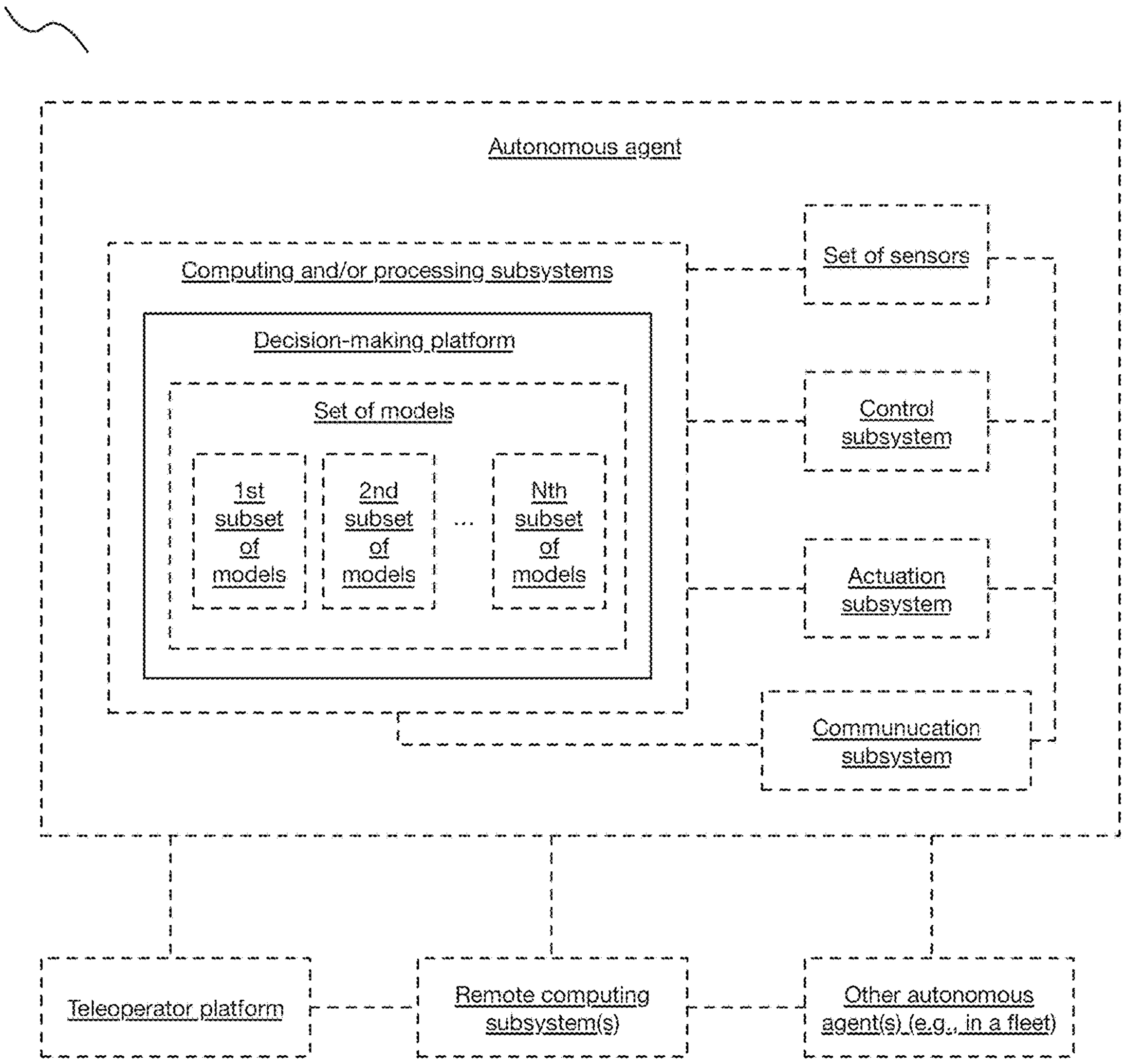
FIG. 1 is a schematic of a system for expanding the operational design domain of an autonomous agent.

As shown in FIG. 1, a system 100 for expanding the operational design domain (ODD) of an autonomous agent includes a decision-making platform (equivalently referred to herein as a decision-making architecture). Additionally or alternatively, the system 100 can include and/or interface with any or all of: a set of computing subsystems (e.g., set of computers, set of software modules and/or task blocks implemented at a set of computers, etc.) and/or processing subsystems (e.g., set of processors, set of processing modules and/or task blocks implemented at a set of processors), a set of sensors, a control subsystem, an actuation subsystem (e.g., drive-by-wire subsystem), a communication subsystem (e.g., to communicate with other agents, a remote computing subsystem, a teleoperator platform, etc.), the autonomous agent, and/or any other suitable components. Further additionally or alternatively, the system 100 can include and/or interface with any or all of the components as described in any or all of: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference.

Figure 2:
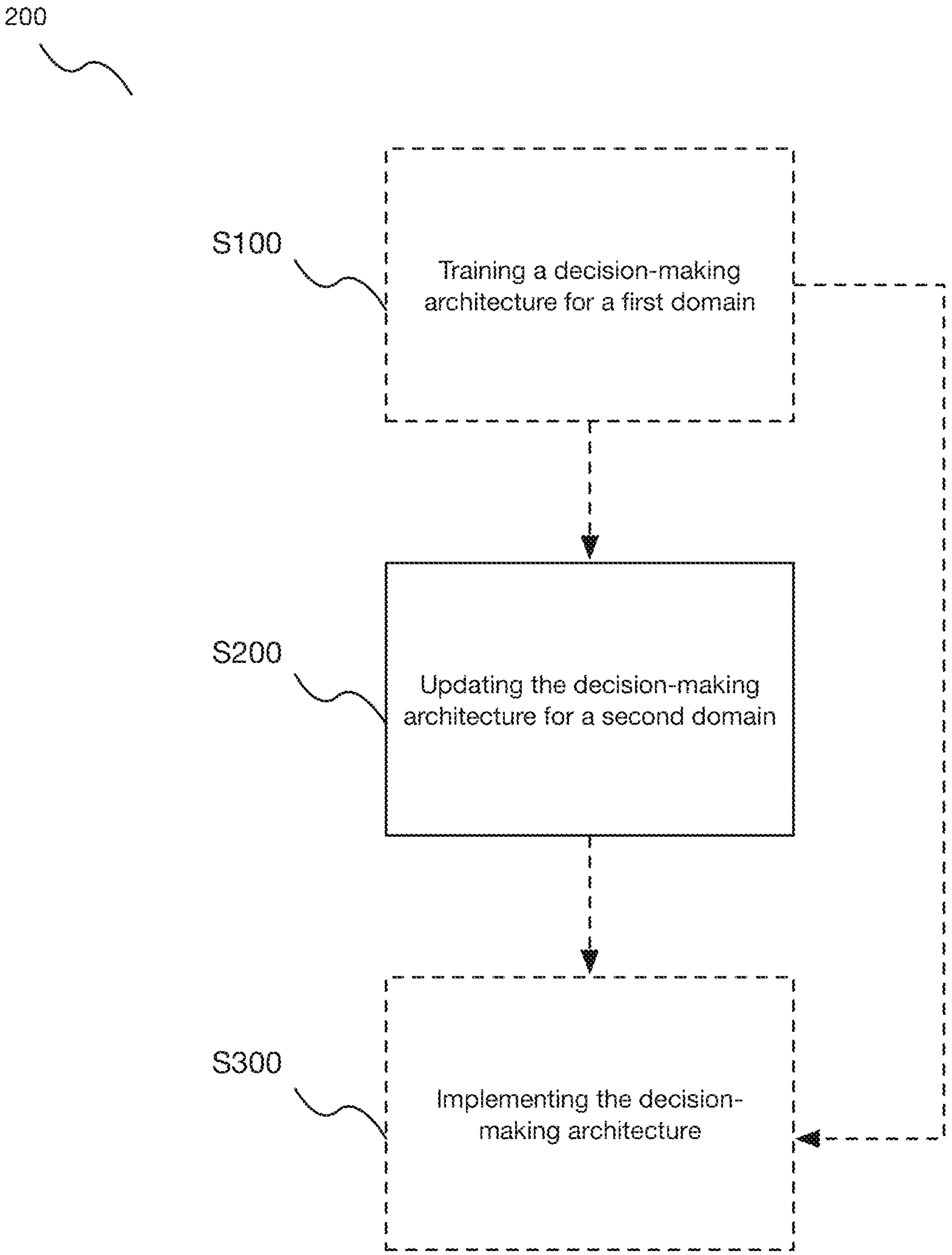
FIG. 2 is a schematic of a method for expanding the operational design domain of an autonomous agent.

As shown in FIG. 2, a method 200 for expanding the operational design domain (ODD) includes determining a decision-making architecture for a first domain S100 and adapting the decision-making architecture to a second domain S200. Additionally or alternatively, the method 200 can include implementing the decision-making architecture S30 and/or any other processes. Further additionally alternatively, the method 200 can include and/or interface with any or all of the processes as described in any or all of: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference, or any other suitable processes performed in any suitable order. The method 200 can be performed with a system 100 as described above and/or with any other suitable system.

2. Benefits

The system and method for expanding the ODD of an autonomous agent can confer several benefits over current systems and methods.

In a first variation, the technology confers the benefit of reducing the amount of time and/or data required to train one or more of the set of models in a decision-making architecture of the autonomous agent when expanding the operational design domain (ODD) associated with the autonomous agent. In preferred variations, the method and/or system leverage data and training from a prior training of the decision-making architecture to adapt it for use in other scenarios (e.g., routes, contexts, actions, etc.) through transfer learning and/or domain adaptation, which allows the autonomous agent to continually build upon knowledge learned from previously demonstrated tasks to accelerate the learning of new tasks, thereby reducing the amount of demonstrations and hence the time required to produce a decision-making architecture which is properly equipped to handle the new task(s).

In a second variation, additional to the first, the technology confers the benefit of preventing and/or minimizing the effects of negative transfer (e.g., leading to decision-making errors made by the vehicle) or other degradations of performance when adapting a decision-making architecture to new domains. In a set of specific examples, implementing a compact latent space representation that abstracts the features of the vehicle's environment, where the compact latent space representation serves as input to a modular set of models in the decision-making architecture, enables an efficient and accurate task mapping process to be implemented from source to target domain tasks, which the inventors have discovered prevents or minimizes the effects of negative transfer.

In a third variation, additional or alternative to those described above, the technology confers the benefit of enabling an optimal selection of the specific models to be used as the starting point for determining a new model for the new operational design domain, which can, in turn, increase the effectiveness of transferring learnings to the new model, improve the performance of the new model, decrease the amount of data and/or time required to produce the new model, and/or can confer any other suitable benefits. In a set of examples, the optimal selection of the specific models is performed with a manual process (e.g., rule-based process), which enables the specific models best suited to determine (e.g., most closely related to) the new model to be used. Additionally or alternatively, the models of the vehicle's decision-making architecture are arranged in a modular, sequential arrangement (e.g., wherein a first set of models are evaluated prior to and inform the selection of the second set of models), which enables only the most relevant models to be identified and used in determining the new set of models (e.g., those most closely related to a new context based on shared features, those most closely related to a new action based on shared features, etc.). This can be in contrast, for instance, to conventional systems and methods which utilize end-to-end deep learning models, which often result in negative transfer due to a lack of tangible and/or measurable similarity between an old model use case (source model) and a new model use case (target model).

In a fourth variation, additional or alternative to those described above, the technology confers the benefit of efficiently and robustly expanding the operational design domain of a set of autonomous vehicles though any or all of: expanding a set of routes (e.g., fixed routes) that the vehicles are configured to (e.g., able to, qualified to, permitted to, etc.) traverse (e.g., autonomously traverse); expanding a type of routes (e.g., fixed routes, dynamically determined routes, etc.) that the vehicles are configured to traverse (e.g., route length, route location, starting point of route(s), destination of route(s), etc.); expanding a number and/or type(s) of contexts (e.g., scenarios) (e.g., types of roads, number of lanes in roads, types of intersections, types of traffic signs, types of zones [e.g., school zones, residential zones, highways, freeways, etc.], etc.) that the vehicle can respond to; expanding a number and/or type(s) of actions (e.g., merging, creeping, parking, loading, unloading, changing lanes, etc.) that the vehicle can perform; expanding a number and/or type of trajectory that the vehicle can execute; expanding a number and/or type of driving conditions (e.g., weather conditions, lighting conditions, traffic conditions, pedestrian concentration, cyclist concentration, etc.) that the vehicles can operate within; expanding the performance conditions (e.g., sensor performance, number and/or types of sensors, sensor degradation level, etc.) in which the vehicles can reliably operate; expanding the use cases (e.g., delivery of goods, transit of passengers, dynamic route use case, etc.) for which the vehicles can be used; and/or otherwise expanding an operational design domain of the vehicles.

Additionally or alternatively, the system and method can confer any other benefit.

3. System 100

As shown in FIG. 1, a system 100 for expanding the operational design domain (ODD) of an autonomous agent (equivalently referred to herein as an autonomous vehicle, ego agent, ego vehicle, or vehicle) preferably includes a decision-making platform (equivalently referred to herein as a decision-making architecture). Additionally or alternatively, the system 100 can include and/or interface with any or all of: a set of computing subsystems (e.g., set of computers, set of software modules and/or task blocks implemented at a set of computers, etc.) and/or processing subsystems (e.g., set of processors, set of processing modules and/or task blocks implemented at a set of processors), a set of sensors, a control subsystem, an actuation subsystem (e.g., drive-by-wire subsystem), a communication subsystem (e.g., to communicate with other agents, a remote computing subsystem, a teleoperator platform, etc.), the autonomous agent, and/or any other suitable components. Further additionally or alternatively, the system 100 can include and/or interface with any or all of the components as described in any or all of: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference.

The system 100 includes and/or implements a decision-making architecture, which functions to perform decision making for the autonomous vehicle through any or all of: high level action and/or behavior determination, path planning, maneuver planning, trajectory planning, and/or any other decision-making processes for operating the autonomous agent.

The system 100 can additionally or alternatively function to control the autonomous agent, perform perception for the autonomous agent, perform prediction for the autonomous agent, and/or otherwise enable the autonomous agent to operate (e.g., safely drive, optimally drive, etc.). Further additionally or alternatively, the system 100 can function to enable updating of the decision-making architecture and/or any other processes.

At least a portion of the decision-making architecture used by the autonomous agent is preferably trained (equivalently referred to herein as learned). In preferred variations, for instance, the decision-making architecture includes one or more sets of trained models, such as, but not limited to: machine learning models, deep learning models (e.g., neural networks, deep neural networks, convolutional neural networks, etc.), and/or any combination. In preferred variations (e.g., as described below), the decision-making architecture includes one or more sets of trained micro-models (equivalently referred to herein as learning modules, learning models, models, etc.), which are selected and evaluated in a modular fashion, depending on a particular scenario (e.g., context) encountered by the autonomous agent and optionally outputs from prior-evaluated micro-models. Variations of this decision-making architecture are described in any or all of: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference. Additionally or alternatively, the decision-making architecture can include and/or implement any other trained processes.

The modular and/or sequential nature of the trained models can confer numerous benefits in efficiently and optimally expanding the operational design domain of the vehicle. In preferred variations (e.g., as further described below), for instance, each of a 1$^{st}$ set of models is associated with a particular context (and optionally a particular context of a particular fixed route), and each of a 2$^{nd}$ set of models is associated with a particular action (e.g., which is determined based on evaluating one or more of the 1$^{st}$ set of models), where the models selected for evaluation in the 1$^{st}$ and 2$^{nd}$ sets are done with a rule-based process (e.g., predetermined mapping, lookup table, etc.). In contrast with an end-to-end decision-making architecture, for instance, models from the 1$^{st}$ and 2$^{nd}$ sets can be selected in logical and explainable ways for determining new models (e.g., in a task mapping process as described below). For instance, if a new route is being added, where the new route contains a new context (e.g., scenario), models from the 1$^{st}$ set which are most relevant to that new context can be selected and used (e.g., exclusively used) as the beginning point (e.g., providing the initial set of weights) for the new context model. This can also prevent effects of negative transfer (e.g., low performance and/or unexpected outputs from the new model), which might result if the source models (models used for training a new model) are not explainably related to the use case of the new model.

Each of the models is preferably in the form of and/or includes a machine learning model, further preferably in the form of one or more neural networks and/or network models (e.g., deep Q-learning network, convolutional neural network [CNN], inverse reinforcement learning [IRL] model, reinforcement learning [RL] model, imitation learning [IL] model, etc.), but can additionally or alternatively include any other suitable models, algorithms, decision trees, lookup tables, and/or other tools.

Each of the models is further preferably trained with inverse reinforcement learning, which functions to determine a reward function and/or an optimal driving policy for each of the context-aware learning modules. The output of this training is further preferably a compact fully-connected network model that represents the reward function and an optimal policy for each learning module. Additionally or alternatively, the learning modules can be otherwise suitably trained (e.g., with reinforcement learning, etc.) and/or implemented.

Figure 4:
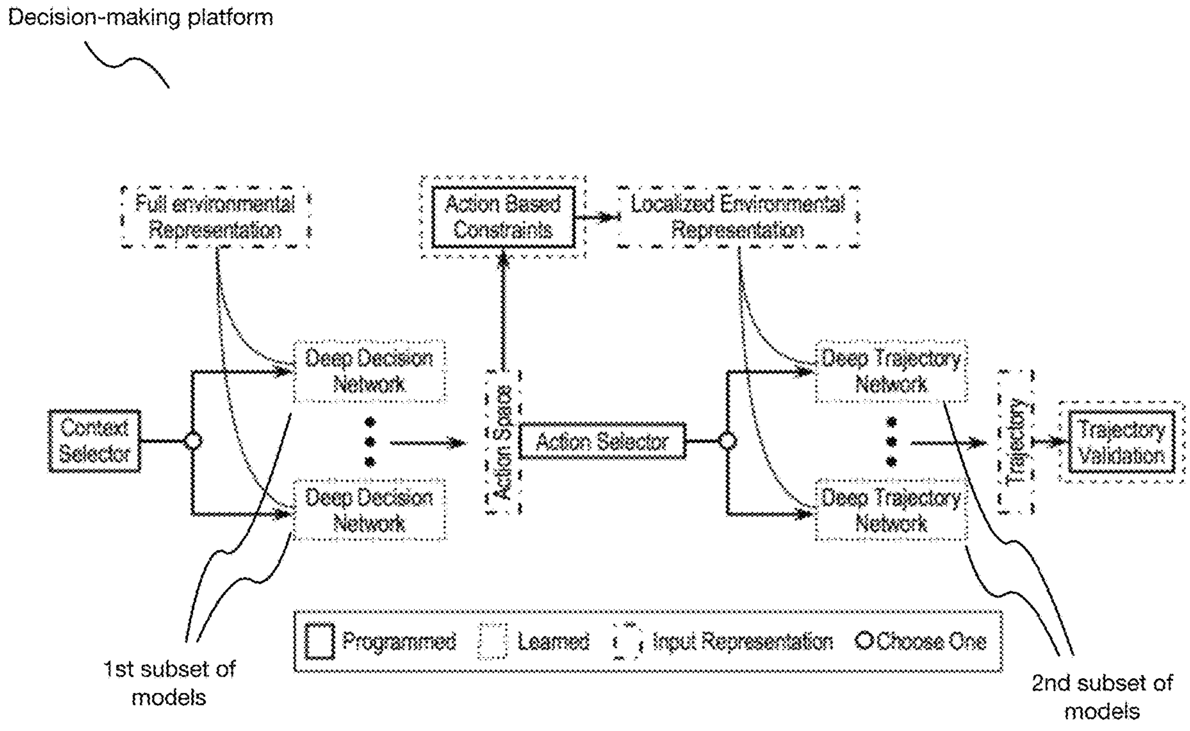
FIG. 4 depicts a variation of a decision-making platform.
Figure 5:
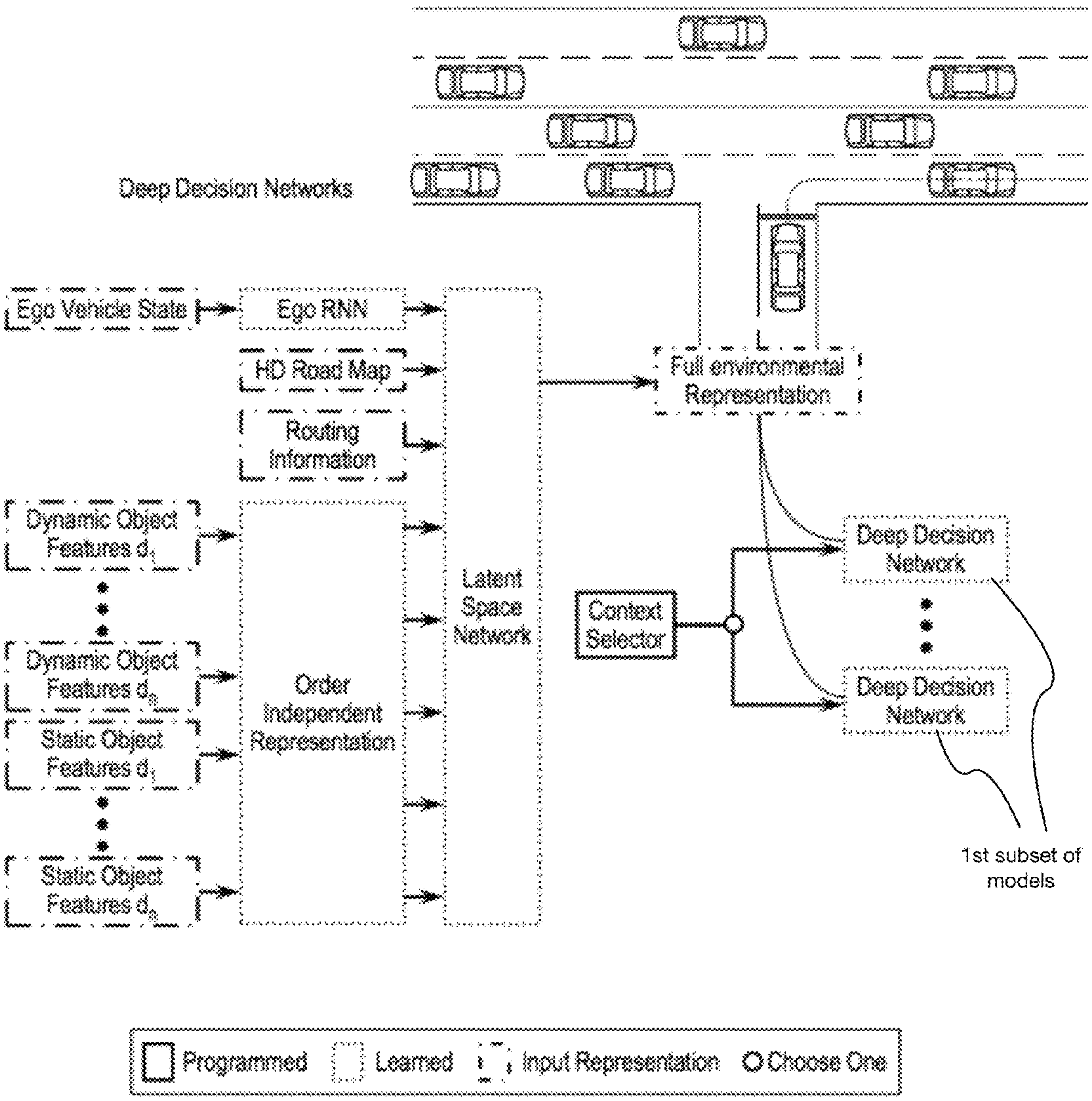
FIG. 5 depicts a variation of a set of models in a decision-making platform.

In a first set of variations, the decision-making architecture includes and/or defines a first subset of models (e.g., deep decision networks as shown in FIGS. 4 and 5), which function to perform a first portion of the decision making of the autonomous agent, and a second subset of models (e.g., deep trajectory networks as shown in FIG. 4), which function to perform a second portion of the decision making. Additionally or alternatively, the decision-making architecture can include any other subsets of models, a single subset of models, and/or any other combination of models.

Each of these subsets of models preferably includes multiple models (e.g., multiple deep decision networks in the first subset, multiple deep trajectory networks in the second subset)—equivalently referred to herein as modular sets of models—wherein a single model from each of the subsets is preferably selected at each point in time during decision-making of the vehicle (e.g., at a predetermined frequency during operation of the autonomous vehicle, continuously during operation of the autonomous vehicle, etc.). Additionally or alternatively, any or all of the subsets can include a single model, the set of models can include any other subsets of models, multiple models can be selected within any or all of the subsets, and/or the decision-making architecture can be otherwise configured and/or organized.

The subsets of models are further preferably associated with an order of evaluation and/or other interfacing (e.g., communication) between subsets, wherein outputs from one or more subset are used in selection of models from a next-evaluated subset. In a set of variations, for instance, the output(s) of the model selected in the 1$^{st}$ subset of models (e.g., selected deep decision network) are used to select which model is next evaluated from the 2$^{nd}$ subset of models (e.g., selected deep trajectory network). Additionally or alternatively, the subsets of models can be otherwise related, not related, and/or otherwise suitably evaluated.

In a set of specific examples, the first subset of models includes a set of deep decision networks (DDNs), one or more (e.g., a single, multiple, etc.) of which is selected based on the current context of the vehicle is responsible for making a decision as to the action that the autonomous agent should take during the current planning cycle (e.g., as described in U.S. application Ser. No. 17/125,668, filed 17 Dec. 2020, which is incorporated herein in its entirety by this reference). The second subset of models includes a set of deep trajectory networks (DTNs), which are selected, optimized, and/or safely constrained based on a particular action. Based on the action determined by the selected DDN, a corresponding DTN is selected and used (e.g., along with a localized view around the vehicle) to plan a safe, effective, and naturalistic trajectory for the vehicle to follow.

An input to any or all of the set of models preferably includes environmental information associated with the autonomous agent, thereby enabling the agent to utilize an awareness of its environment in its decision making. This awareness preferably contains information from the current time step as well as from previous time steps, but can alternatively include any other information. In preferred variations, the environmental information is distilled into a smaller latent space representation. This can simplify the learning process of any or all of the set of models, as well as enable efficient and logical mappings to be determined in S220 in accordance with updating the decision-making architecture through transfer learning.

The latent space representation is further preferably used to train and/or refine the training of any or all of the set of models. Additionally or alternatively, the latent space representation (e.g., features of the latent space representation) can be used to determine which models to use as source models in determining a new target model, the models can be trained on other data, the method can be implemented absent of a latent space representation, and/or the method can be otherwise suitably implemented.

The latent space representation (equivalently referred to herein as an abstract space representation) is preferably configured to represent an environment (or a targeted subset of the environment) of the autonomous agent with information and/or features that are comparable among different use cases (e.g., contexts, actions, routes, etc.), which thereby enables learnings to be easily and efficiently transferred between models. This can be in contrast to and/or advantageous in comparison with, for instance, models and/or implementations which use raw data (e.g., raw sensor data as inputs), as the raw data is not as easily consumable or transferable between models. In preferred variations, for instance, the latent space representation determines a set of features which define the environment, where the features are preferably abstract/abstracted (e.g., determined with an algorithm, model, trained algorithm and/or model, etc.) and further preferably order-independent (e.g., enabling comparisons among latent space representations for different contexts, actions, routes, etc.). In examples, for instance, the latent space representation produces an order-independent representation for how many objects are in the autonomous agent's environment, what features (e.g., abstracted features, cost values or other metrics, etc.) are associated with the objects and/or the environment, and/or any other information. In a particular specific example where the features of the latent space representation are abstracted (e.g., not qualitatively meaningful), for some contexts and/or actions, a curb may be relevant to the vehicle's operation, whereas in other contexts and/or actions, a similar impedance to the vehicle's motion (e.g., a barricade) is present—since the latent space representation abstracts these objects out, the learnings from navigating the curb can be effectively utilized and used in learning how to navigate the barricade.

Additionally or alternatively, the latent space representation can include any or all of the following information, where the information is preferably standardized (e.g., normalized, processed into non-unit values, abstracted, processed according to a machine learning algorithm, etc.) into a latent space representation format: vehicle position information (e.g., latitude, longitude, altitude, etc.), vehicle movement information (e.g., velocity, acceleration, etc.), chassis information (e.g., fuel level, tire pressure, etc.), external inputs (e.g., map), perception inputs (e.g., the location(s) of other vehicles or other objects, movement information associated with other vehicles or other objects, etc.), predicted information (e.g., predicted trajectories of other vehicles, predicted future positions or future movements of other vehicles, etc.), determinations from previous decision-making processes (e.g., selected context for the vehicle based on its location relative to a map, etc.), and/or any other information.

An additional and/or alternative potential benefit of the latent space representation is that it enables the same basic architecture (e.g., structure) to be implemented in any or all of the models (e.g., all of the $1^{st}$ set of models, all of the $2^{nd}$ set of models, all models, etc.), which enables learnings to be more effectively and efficiently transferred between models. For instance, all of the $1^{st}$ set of models (e.g., deep decision networks, context-based models, etc.) and/or any or all of the $2^{nd}$ set of models can have the same model architecture (e.g., number of neural network layers, type of neural network, size of neural network, model input types and/or model formats, etc.), which allows the method to transfer learnings faster among the models. Additionally or alternatively, any or all of the models can have different architectures and/or other differences.

In a set of specific examples, each of a $1^{st}$ set of models has the same architecture (e.g., number of neural network layers, neural network type, etc.) despite being associated with different contexts, where the models differ in any or all of their weight values. Additionally or alternatively, each of a $2^{nd}$ set of models has the same architecture (e.g., number of neural network layers, neural network type, etc.) despite being associated with different actions, where the models differ in any or all of their weight values.

Additionally or alternatively, the models can be otherwise suitably architected and/or related.

The latent space representations preferably differ between the $1^{st}$ and $2^{nd}$ sets of models, wherein the latent space representations utilized by the $2^{nd}$ set of models, which are configured to be implemented after a corresponding model of the $1^{st}$ set, are refined (e.g., localized, targeted, etc.) based on the output of the corresponding model of the $1^{st}$ set. In set of variations, for instance, each of the $1^{st}$ set of models (set of deep decision networks) is associated with a particular context type (e.g., scenario, road geometry, road features, etc.) and optionally a particular context type within a particular fixed route), wherein each of these models uses the current context of the vehicle (e.g., as retrieved from a predetermined set of labels in a map, as determined based on a location of the vehicle, etc.) and a latent space representation of its full environment (e.g., all of the environment within a field of view of its sensor stack) to select an action for the vehicle, where this action informs the selection of one of the $2^{nd}$ set of models (set of deep trajectory networks). This selected model of the $2^{nd}$ set then uses a latent space representation which is informed (e.g., constrained) based on the selected action, such that the representation of the vehicle's environment for this model is localized only to the areas which are important for the vehicle to know about in order to execute the action (e.g., only a view in front of the vehicle if it is moving forward, only a view in back of the vehicle if it is backing up, etc.) through the determination of a trajectory for the vehicle to follow.

Additionally or alternatively, the models can use the same latent space representations, different latent space representations, and/or any combination of latent space representations.

In a preferred set of variations (e.g., as shown in FIG. 5), for instance, any or all of the $1^{st}$ and/or $2^{nd}$ subset of models take as input any or all of the following information: information associated with (e.g., a representation of) a set of detected dynamic objects including any or all of their current position, size, previous path, and predicted path into the future (alternatively, the system can perform self-prediction of dynamic object motion); information associated with a set of all static objects and their current states; a map (e.g., which prescribes the context for the vehicle based on its position); routing information; and the current state (e.g., position, orientation, pose, etc.) of the autonomous agent. Additionally or alternatively, any other information can be used to determine the latent space representation. The latent space representation is preferably determined with a model, further preferably a trained model (e.g., separate and distinct from the $1^{st}$ and $2^{nd}$ subset of models), which functions to output an effective latent space representation (e.g., which grants order invariance for the objects which serve as inputs). Additionally or alternatively, the latent space representation can be otherwise suitably determined.

In a set of specific examples, the static and dynamic objects (along with their predicted future paths) as returned by a perception module of the system serve as inputs into a neural network, which produces a latent space representation which grants order invariance to the objects. This data is then combined along with the map, routing information, and vehicle state, and used as inputs into a $2^{nd}$ network that represents the entire input space as the most effective latent space representation.

The decision-making architecture further preferably implements one or more programmed (e.g., rule-based, coded, hardcoded, etc.) processes (e.g., as shown in FIG. 4, as shown in FIG. 5, etc.), such as the programmed selection of trained models to be evaluated during decision making. In preferred variations, for instance, a decision-making architecture (e.g., for motion planning, for trajectory generation, etc.) implements a programmed selection of its trained components (e.g., trained micro-models, trained micro-model task blocks, trained algorithms and/or models, etc.).

The combination of both trained and programmed features (e.g., as shown in FIG. 4, as shown in FIG. 5, etc.) of the autonomous agent's decision-making architecture can have numerous benefits, such as in minimizing and/or eliminating drawbacks suffered from implementing either trained or programmed approaches exclusively. These drawbacks and/or complications can include, for instance: unnatural decisions and/or motions executed by the autonomous agent (e.g., when using only programmed motion planners); an exhaustive and specific list of scenarios to program (e.g., hardcode) (e.g., when using only programmed motion planners); lack of safety assurances and/or safety integration (e.g., resulting from implementing motion planning in an end-to-end trained fashion); the requirement to capture all possible scenarios the agent may encounter; and/or any other drawbacks.

In preferred variations, for instance, the decision-making architecture captures the flexibility of machine learning approaches while ensuring safety and a practical, efficient learning framework for scalability across an ODD associated with the autonomous agent. In examples, for instance, each of the set of models is a trained neural network, while the model selection from associated modular sets is performed with a rule-based (e.g., programmed) process.

Alternatively, the decision-making architecture can be fully trained (e.g., including an end-to-end deep learning model), fully programmed, and/or otherwise distributed among trained and programmed.

The decision-making architecture can optionally be configured for an operational design domain (ODD) associated with one or more particular use cases for the autonomous agent. In some variations, for instance, the decision-making architecture is configured for a limited ODD in the form of a fixed route architecture (e.g., for use in making deliveries with the autonomous agents, for use cases not involving passengers, etc.). Additionally or alternatively, the autonomous agents and associated decision-making architectures can be configured for any other use cases.

In a set of examples, the ODD is further associated with a transportation of goods (e.g., deliveries, business-to-business [B2B] deliveries, transportation of commercial goods, transportation of non-human objects, etc.), such as between any or all of: distribution centers, retail centers (e.g., stores), warehouses or goods storage sites, manufacturers, and/or any other locations. In specific examples, for instance, any or all of the fixed routes can involve loading and/or unloading sites (e.g., loading docks) associated with any or all of these locations.

Additionally or alternatively, the ODD of the vehicle(s) can be otherwise suitably configured.

Additionally or alternatively, the decision-making architecture can include any other components and/or features, and/or be otherwise suitably configured.

In a first variation of the system 100, the system includes a decision-making architecture developed for a fixed route ODD with a context-aware data-driven modular learning system (e.g., as described in U.S. application Ser. No. 17/125,668, filed 17 Dec. 2020, which is incorporated herein in its entirety by this reference).

In specific examples, the system facilitates using deep learning micro-models optimized and trained for a particular route in a specific context for a specific action, and can be re-purposed (e.g., re-used, re-purposed through transfer learning, through re-training with a smaller dataset, through re-training with a more targeted dataset) for use on a different route in a similar context for a similar action set. The proposed system is further preferably designed to ensure such a translation allows for a transfer that reduces target training time without resulting in any negative transfer (NT), but can additionally or alternatively be otherwise configured. This can be done by architecting the decision-making architecture system with multiple subsets of models whose intended functionality is restricted to specific explainable tasks with the inputs for such models translated into latent feature space to facilitate a common space in which distribution discrepancies of different source and target domain data can be minimized. A first subset of models uses the current context of the vehicle, and optionally a full representation of the environment around it, to select an action which the vehicle should undertake. Vehicle actions may include "stopping behind a vehicle", "yielding to a vehicle", or "merging onto a road," among others. The second subset of models are selected, optimized, and safely constrained based on a specific action. This subset of models can optionally use a localized view (e.g., relative to the environmental representation) around the vehicle to plan a safe, effective and naturalistic trajectory which the vehicle should follow.

Additionally or alternatively, the system 100 can include any other components.

4. Method 200

As shown in FIG. 2, a method 200 for expanding the operational design domain (ODD) includes determining a decision-making architecture for a first domain S100 and adapting the decision-making architecture to a second domain S200. Additionally or alternatively, the method 200 can include implementing the decision-making architecture S30 and/or any other processes. Further additionally alternatively, the method 200 can include and/or interface with any or all of the processes as described in any or all of: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference, or any other suitable processes performed in any suitable order.

The method 200 functions to enable the decision-making architecture of the autonomous agent to efficiently adapt to new scenarios (e.g., new contexts, actions, environments, etc.), such as when expanding the number of routes, type of routes, tasks and/or contexts and/or actions within a route, conditions (e.g., daytime vs. nighttime, inclement weather, etc.) associated with a route, non-fixed-route scenarios, and/or other features associated with expanding an operational design domain (ODD) of the autonomous agent. This can enable any or all of: minimizing and/or reducing the time required to adapt the decision-making architecture, minimizing and/or reducing the amount of data required to adapt the decision-making architecture, and/or any other outcomes. Additionally or alternatively, the method 200 can function to optimize the decision-making architecture for various domains, enable the decision-making architecture to be reliably and/or safely adapted to different domains (e.g., without the effects of negative transfer, etc.), and/or otherwise provide a robust yet adaptable decision-making architecture for use by the autonomous agent.

In examples, for instance, the method can adapt the decision-making architecture of the vehicles for use in any or all of: different contexts, different actions, different context-action pairs, different routes (e.g., same contexts and/or actions in different routes, different contexts and/or actions in different routes), different weather conditions, different traffic conditions, different hardware and/or vehicle types (e.g., different sensor types and/or sensor numbers and/or sensor arrangements), the occurrence of anomalies (e.g., sensor degradation) in hardware and/or software of the vehicle (e.g., as indicated by an uncertainty value associated with inputs of the vehicle exceeding a predetermined threshold), and/or any other uses.

In preferred variations, the method 200 functions to enable scaling of the ODD of the agent through transfer learning, while minimizing and/or preventing negative effects of domain scaling. For instance, learning from demonstration (examples and/or interaction) can be implemented to operate a vehicle which imitates a human driver. However, even for a single task (e.g., taking a protected right turn), such approaches typically require numerous demonstrations. For scalability, such a system must learn many tasks and scenarios via demonstration; this process would substantially burden the system developer if each task were learned in isolation. The method 200 can optionally function to utilize transfer learning from previously learned scenarios and/or tasks, which allows the agent to continually build upon knowledge learned from previously demonstrated tasks to accelerate the learning of new tasks, reducing the amount of demonstrations and hence the time required for learning. As a further complication in implementing transfer learning, its effectiveness is not guaranteed, and the following occurrences can add complexity: the learning tasks in the two domains are not related or similar; the source domain and target domain data distributions have differences (e.g., significant differences); and a suitable model cannot be applied to both domains. In these cases, negative transfer (NT) can occur, in which introducing source domain data/knowledge undesirably decreases the learning performance in the target domain. The inventors have discovered that a solution to the above problem is transfer learning (TL), or domain adaptation (DA), which tries to utilize data or knowledge from related domains (called source domains) to facilitate the learning in a new domain (called target domain). In machine learning applications, TL can function to improve a model's ability to generalize in the target domain, which usually has zero or a very small number of labeled data.

Additionally or alternatively, the method 200 can perform any other functions and/or confer any other benefits.

The method 200 is preferably performed with and/or utilized by a system 100 as described above, but can additionally or alternatively be performed in accordance with any other suitable system(s).

The method 200 is preferably at least partially performed at a computing and/or processing system, such as at a computing and/or processing system onboard the agent, a computing and/or processing system remote from the agent (e.g., at a cloud-based computing system and/or server), another location, and/or any combination of locations. In a preferred set of variations, for instance, the decision-making architecture is determined and/or updated at a remote computing system, and then transmitted to, stored, and utilized onboard the agent. Additionally or alternatively, the method 200 can be performed at and/or with any other suitable components.

4.1 Method—Determining a Decision-Making Architecture for a First Domain S100

The method 200 can include determining a decision-making architecture for a first domain, which functions to determine an initial decision-making architecture for the autonomous agent. Additionally or alternatively, S100 can function to determine a decision-making architecture which can be efficiently and/or quickly adapted to expand to new domains for the autonomous agent, and/or can perform any other suitable functions.

S100 is preferably performed initially in the method 200 (e.g., prior to deployment of the autonomous agent, prior to performance of any or all remaining processes of the method, prior to S200, etc.), but can additionally or alternatively be performed multiple times during the method 200 (e.g., as new inputs are received, as the decision-making architecture is continually/continuously revised and/or updated, etc.), and/or at any other times. Alternatively, the method 200 can be performed in absence of S100

A domain preferably refers herein to an operational design domain (ODD) associated with the autonomous agent, which specifies the operating domain in which the decision-making architecture is at least configured and/or designed to operate (e.g., safely operate, reliably operate, etc.). In variations including fixed route use cases, for instance, the domain can include the fixed routes that the autonomous agent has been trained on and/or validated to drive.

Additionally or alternatively, the domain can include and/or specify (e.g., in conjunction with a set of fixed routes, independently of a set of fixed routes, etc.) any or all of: a particular set of contexts (e.g., single lane roads, multi-lane roads, parking lots, residential zones, school zones, highway roads, one-way roads, two-way roads, etc.), a particular set of actions and/or behaviors (e.g., within a particular context, independently of a particular context), environmental conditions (e.g., weather conditions, lighting conditions, timing conditions, traffic conditions, etc.), infrastructure conditions (e.g., road quality [e.g., smooth, potholes, asphalt, dirt, etc.], whether or not a road has a neighboring sidewalk, etc.), and/or any other features or conditions. Additionally or alternatively, a domain can include and/or refer to any other information.

In some examples, for instance, expanding the domain of the autonomous vehicles can include any or all of: adding new routes, adding new contexts, adding new actions for the vehicle to execute, changing the type of data used to train and/or update a training of any or all the set of models (e.g., training based on simulation data in addition to real-world sensor data), changing a driving convention of the vehicle(s) (e.g., adapting the vehicles to drive on the left side of the road rather than on the right side), adding new driving conditions (e.g., weather conditions, traffic conditions, etc.) that the vehicles are operable in, adding new use cases that the vehicles are operable in (e.g., rather than going to a loading dock to make deliveries, now making deliveries at residential homes), and/or otherwise changing or expanding the use of the vehicles.

In preferred variations of the method 200, the first domain refers to an initial domain, where the second domain (e.g., as described below) expands upon (e.g., includes additional routes and/or contexts and/or actions, etc.) the first domain (e.g., includes the first domain along with additional scenarios for the autonomous agent). Additionally or alternatively, the second domain can include a portion of the first domain, be separate and/or unrelated from (e.g., non-overlapping with) the first domain, be partially overlapping with the first domain, be of equal or less expanse than the first domain, and/or be otherwise composed.

In a set of examples, the first domain includes a predetermined set of fixed routes that the models of the decision-making architecture (e.g., DDNs, DTNs, etc.) were trained on (e.g., comprehensively trained on). This can include for instance, the set of predetermined fixed routes from which data was collected and used to construct (e.g., train, determine fundamental architectural features of, etc.) the initial set of models (e.g., initial $1^{st}$ subset of models, initial $2^{nd}$ subset of models, etc.) for decision-making of the autonomous vehicle.

Additionally or alternatively, the first domain can include and/or be defined based on any other information, such as, but not limited to: a predetermined geographical area, a use case associated with the autonomous vehicle (e.g., delivery of goods, transport of passengers, etc.), a set of road features (e.g., number of lanes, road surface, road type, etc.), a zone/zoning type (e.g., residential zone, commercial zone, etc.) associated with a region of roadways in the first domain, and/or any other information.

Additionally or alternatively, S100 can include any other suitable processes (e.g., as described below, additional or alternative to those described below, etc.).

4.11 Method—Collecting a $1^{st}$ Set of Inputs S110

Figure 3:
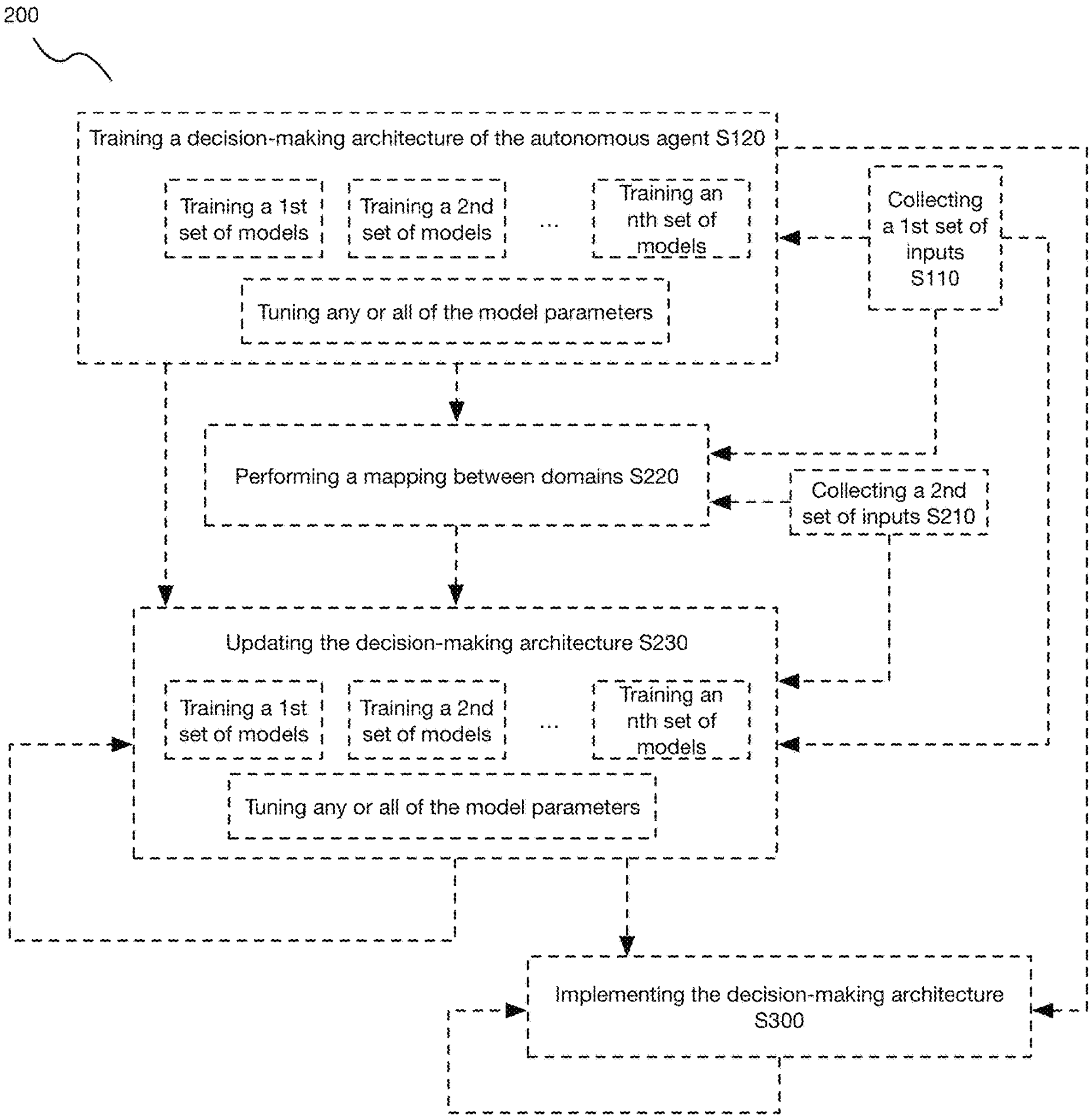
FIG. 3 is a schematic variation of a method for expanding the operational design domain of an autonomous agent.

S100 can optionally include collecting a $1^{st}$ set of inputs S110 (e.g., as shown in FIG. 3), which functions to receive data with which to determine (e.g., train) any or all of the decision-making architecture. Additionally or alternatively, the $1^{st}$ set of inputs can be used for any or all of: evaluating and/or validating any or all of the decision-making architecture, testing any or all of the decision-making architecture, performing a task mapping between domains in S220, updating the decision-making architecture in S230, implementing the decision-making architecture in S300, and/or otherwise suitably used.

S110 is preferably performed initially and further preferably multiple times (e.g., repeatedly, continuously, at a predetermined frequency, at a random set of intervals, etc.) during operation of the vehicle within the first domain (e.g., with a first set of fixed routes), but can additionally or alternatively be performed at any suitable times during the method 200.

The $1^{st}$ set of inputs is preferably associated with a first domain (e.g., as described above)—equivalently referred to herein as a source domain—associated with the autonomous agent, but can additionally or alternatively be associated with other domains (e.g., the $2^{nd}$ domain), a combination of domains, no domain (e.g., in particular), and/or any other domains.

In a preferred set of variations, for instance, the $1^{st}$ set of inputs includes information (e.g., sensor data) collected while the autonomous vehicle is traversing one or more of the predetermined set of fixed routes that define the first domain.

The $1^{st}$ set of inputs preferably includes data collected at a set of sensors (e.g., sensors onboard the autonomous agent, sensors in an environment of the autonomous agent, sensors onboard an aggregated set of autonomous agents, sensors onboard an aggregated set of non-autonomous agents, etc.), such as data collected from any or all of: cameras, Radar sensors, Lidar sensors, audio sensors, location sensors (e.g., GPS sensors), motion and/or orientation sensors (e.g., accelerometers, speedometers, gyroscopes, audio sensors (e.g., microphones), and/or any other sensors. Additionally or alternatively, the $1^{st}$ set of inputs can include historical information (e.g., collected previously at one or more agents), information from one or more databases (e.g., maps, labeled maps, etc.), simulated data, and/or any other data.

The $1^{st}$ set of inputs (and/or a portion of the $1^{st}$ set of inputs) is preferably used as training data for the decision-making architecture, but can additionally or alternatively be used as test data (equivalently referred to herein as testing data), evaluation data (e.g., in performing hyperparameter tuning of any or all of the set of models of the decision-making architecture), validation data, and/or any other data.

The $1^{st}$ set of inputs can additionally or alternatively be used in defining and/or characterizing a domain associated with the autonomous agent, used in implementing the decision-making architecture (e.g., be used in perception, prediction, localization, etc.), and/or can be otherwise suitably used and/or determined.

Additionally or alternatively, S110 can include any other suitable processes.

4.12 Method—Training the Decision-Making Architecture S120

S100 preferably includes training the decision-making architecture S120 (e.g., as shown in FIG. 3), which functions to create an initial iteration of the decision-making architecture for operation of the autonomous agent (e.g., according to a first domain). Additionally or alternatively, S120 can function to produce a decision-making architecture which can be efficiently adapted and refined in subsequent processes of the method 200, and/or can perform any other functions.

S120 is preferably performed in response to and based on S110, but can additionally or alternatively be performed prior to S110, based on a portion of S110 (e.g., wherein subsequent iterations of S110 are used to refine and/or update and/or re-train the decision-making architecture, etc.), multiple times during the method 200, and/or at any other time(s).

The decision-making architecture trained in S120 is preferably determined for the first domain and based on the first set of inputs (e.g., a portion of the first set of inputs, all of the first set of inputs, etc.). Additionally or alternatively, the decision-making architecture can be trained for any other domains.

S120 preferably includes training any or all of the set of models of the decision-making architecture (e.g., determining the architecture of each of the set of models, determining learned model parameters for each of the set of models, etc.), but can additionally or alternatively include any or all of: testing, evaluating (e.g., hyperparameter tuning), and/or validating models of the decision-making architecture.

Training preferably includes determining the values of any or all of the parameters associated with decision-making architecture, such as the parameters (e.g., weights) which define any or all of a set of micro-models (e.g., deep decision networks, deep trajectory networks, etc.) evaluated during decision making of the autonomous agent. This preferably includes determining at least the learned model parameters (e.g., node weights, parameters which optimize a loss function associated with the model(s) and/or overall architecture, etc.) and optionally any or all of each model's architecture (e.g., number of layers, organization of layers, etc.). Additionally or alternatively, training can include determining any or all of the parameters (e.g., constraints, weights, learning rates, etc.) which define the model architecture (e.g., unlearned parameters)—equivalently referred to herein as hyperparameters—such as through one or more hyperparameter tuning processes (e.g., grid search tuning, random search tuning, parameter sweep tuning, a Bayesian optimization process, a gradient-based optimization process, an evolutionary optimization process, etc.). Further additionally or alternatively, training can include testing, evaluating, optimizing, and/or otherwise determining any or all of the models of the decision-making architecture.

In some variations, any or all of the models within the decision-making architecture are optimized for one or more of: a specific action, a specific context, and/or a specific route associated with a domain. In hyper-optimized use cases, for instance, any or all of the micro-models (e.g., $1^{st}$ subset of models) in the decision-making architecture have parameters (e.g., weights) which are optimized for a particular action in a particular context for a particular route (e.g., fixed route). Additionally or alternatively, any or all of the models can be otherwise optimized, not optimized relative to any of this information, and/or any combination.

At least a portion of the decision-making architecture is preferably trained with inverse reinforcement learning. Additionally or alternatively, any or all of the models can be trained with reinforcement learning, imitation learning, and/or any other types of training/learning. Further additionally or alternatively, training any or all of the models can include and/or interface with any or all of the processes described in any or all of: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference.

In a preferred set of variations, S120 includes training each of a first subset of models (e.g., deep decision networks) and each of a second subset of models (e.g., deep trajectory networks), such as those described in any or all of: U.S. application Ser. No. 17/116,810, filed 9 Dec. 2020, U.S. application Ser. No. 17/125,668, filed 17 Dec. 2020, and U.S. application Ser. No. 17/127,599, filed 18 Dec. 2020, each of which is incorporated in its entirety by this reference.

In specific examples, S120 includes training each of the first subset of models based on the context associated with each of the first subset of models, and training each of the second subset of models based on the action and/or actions associated with each of the second subset of models.

S120 can additionally or alternatively include determining any or all of the programmed processes and/or features of the decision-making architecture (e.g., as described above).

Additionally or alternatively, S100 can include any other suitable processes.

4.2 Method—Determining a Decision-Making Architecture for a Second Domain S200

The method 200 includes determining a decision-making architecture for a second domain S200, which functions to adapt the decision-making architecture to a second domain, such as an expanded domain. Additionally or alternatively, S200 can function to enable the decision-making architecture to be adapted efficiently and/or with a minimal set of data, and/or can perform any other suitable functions.

S200 is preferably performed in response to and/or based on S100, but can additionally or alternatively be performed multiple times, in response to other processes, in response to a trigger, and/or at any other times.

4.21 Method—Collecting a $2^{nd}$ Set of Inputs S210

S200 preferably includes collecting a $2^{nd}$ set of inputs S210 (e.g., as shown in FIG. 3), which functions to receive information with which to perform any or all of the remaining processes of S200 and/or the method 200, such as any or all of: performing a task mapping in S220; updating a decision-making architecture in S230; implementing a decision-making architecture in S300; and/or any other processes. Additionally or alternatively, the $2^{nd}$ set of inputs can be used in any processes as described above, and/or S210 can perform any other suitable functions.

S210 can be performed prior to S220, in response to S220, prior to and/or in response to any other processes of the method 200, during operation of one or more autonomous agents, independently of any or all of the processes of the method 200, contemporaneously (e.g., overlapping with, partially overlapping with, simultaneously with, etc.) with S110, multiple times (e.g., continuously, at a predetermined frequency, at a set of random intervals, etc.), and/or at any other times.

The $2^{nd}$ set of inputs (equivalently referred to herein as auxiliary data) is preferably associated with a $2^{nd}$ domain (equivalently referred to herein as a target domain), which is further preferably expanded relative to and/or different than (e.g., non-overlapping with, partially overlapping with, overlapping with, etc.) the $1^{st}$ domain (e.g., includes additional contexts, includes additional actions, includes additional routes, includes additional environmental conditions, any combination, etc.). Alternatively, the $2^{nd}$ set of inputs can be associated with the $1^{st}$ domain, multiple domains, and/or any other domains.

The $2^{nd}$ set of inputs preferably includes the same types of data as in the $1^{st}$ set of inputs (e.g., as described above), such as sensor data from same or similar sensors, simulation data from same or similar simulation subsystems, and/or any other data, but can additionally or alternatively include different types of data, any other data types, and/or any combination of data.

In a preferred set of variations, the $2^{nd}$ set of inputs includes data which is related to a set of contexts and/or actions and/or routes and/or environmental conditions which are not included in the first domain. Additionally or alternatively, the $2^{nd}$ set of inputs can include data related to (e.g., categorized within) the first domain, data from a combination of domains, and/or any other data.

The $2^{nd}$ set of inputs further preferably includes data which is specific to (and collected from) the specific use cases associated with the new models being developed in S200. For instance, each new model is preferably refined (e.g., re-trained, updated, etc.) in S230 based on data which is specific to the particular use (e.g., particular new context, particular new action type, particular new weather condition, particular new fixed route, etc.) that the new model is specifically configured for. This can include, for instance, for a new model of the $1^{st}$ set of models (e.g., deep decision network), collecting data from a new fixed route within the new context along that new fixed route, where this data is part of the $2^{nd}$ set of inputs and used to refine the weights of this particular new model. For a new model of the $2^{nd}$ set of models (e.g., deep trajectory network), the data used to refine the model can be taken from sensors of a vehicle while or proximal in time to it executing that new action (e.g., within a new fixed route, within a particular context, etc.). This functions to enable collection of a most minimal, targeted set of data for refining the new model for its particular use.

Additionally or alternatively, S210 can include any other suitable processes and/or be otherwise suitably performed.

4.22 Method—Performing a Mapping Between the First and Second Domains S220

S200 preferably includes performing a mapping (equivalently referred to herein as a task mapping) between the first and second domains S220 (e.g., as shown in FIG. 3), which functions to enable the decision-making architecture determined in S110 to be adapted (e.g., efficiently adapted) to the $2^{nd}$ domain (e.g., without requiring the training of a comprehensive and new decision-making architecture). S220 additionally or alternatively function to leverage the decision-making architecture determined in S100; prevent negative transfer and/or other unwanted outcomes that might result from improper updating of the set of models; and/or can perform any other suitable functions.

S220 can be performed at any suitable time(s) during the method 200, such as: in response to S210, prior to S210 (e.g., wherein the $2^{nd}$ set of inputs is collected in response to determining a second domain and/or performing the task mapping), prior to and/or response to any other processes of the method, independently of other processes in the method, multiple times (e.g., continuously, at a predetermined frequency, at a random set of intervals, for each new model being developed, etc.) during the method, during development of a new model, and/or at any other times.

Figure 7:
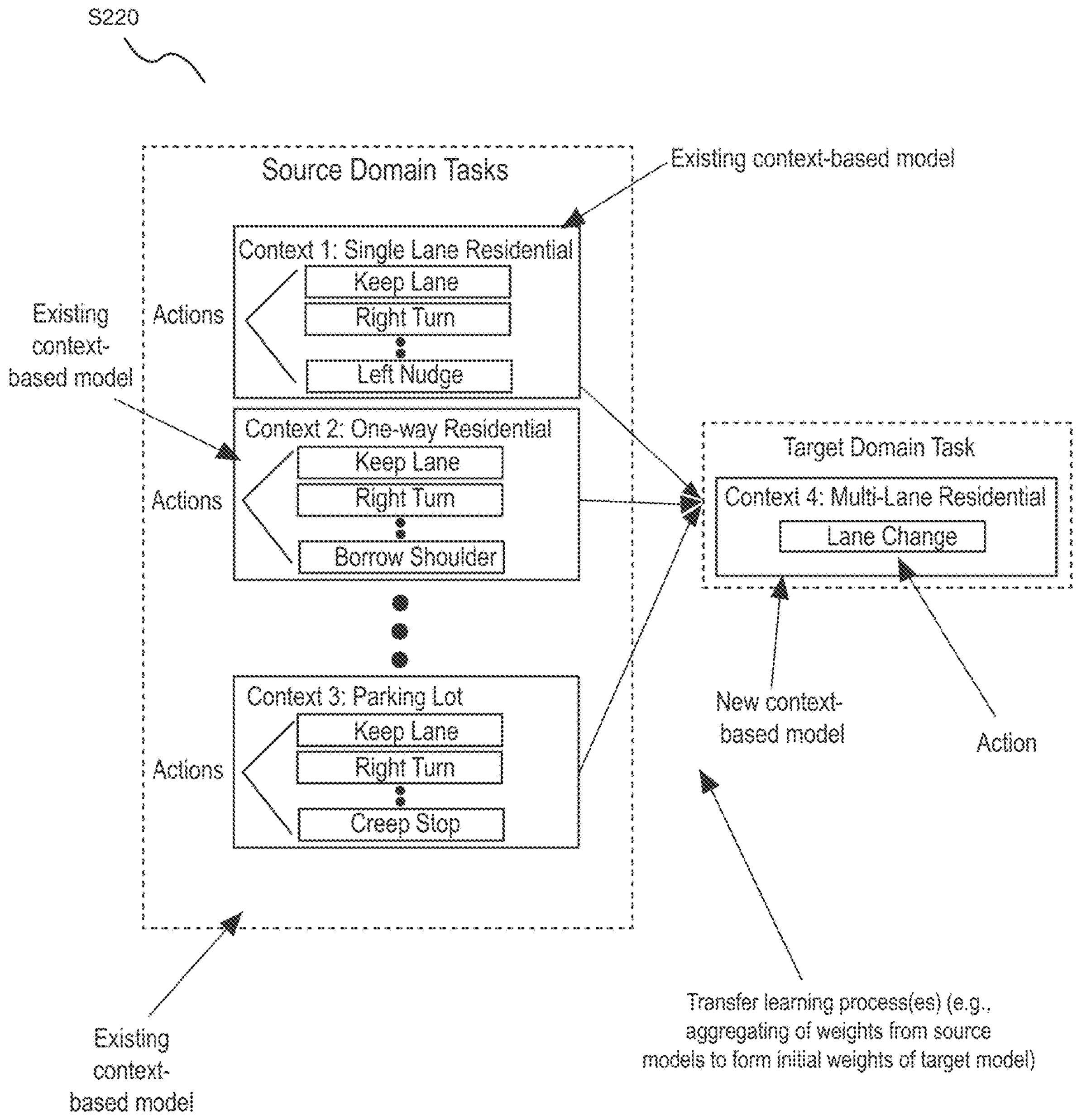
FIG. 7 depicts a schematic example of a portion of a method for expanding the operational design domain of an autonomous agent.

A task herein refers to any features and/or aggregation of features of an ODD associated with the autonomous agent, such as, but not limited to: a context, action, behavior, route, environmental conditions, and/or any other features. In a preferred set of variations (e.g., as shown in FIG. 7), for instance, the task includes a context-action pairing (e.g., a lane change action within a multi-lane residential context), where a second domain can reflect the addition of any or all of: a new context, a new action (e.g., overall), and/or a new action within that context. A mapping herein refers to the mapping between (e.g., defined association between, relationship between, etc.) these tasks.

Figure 6:
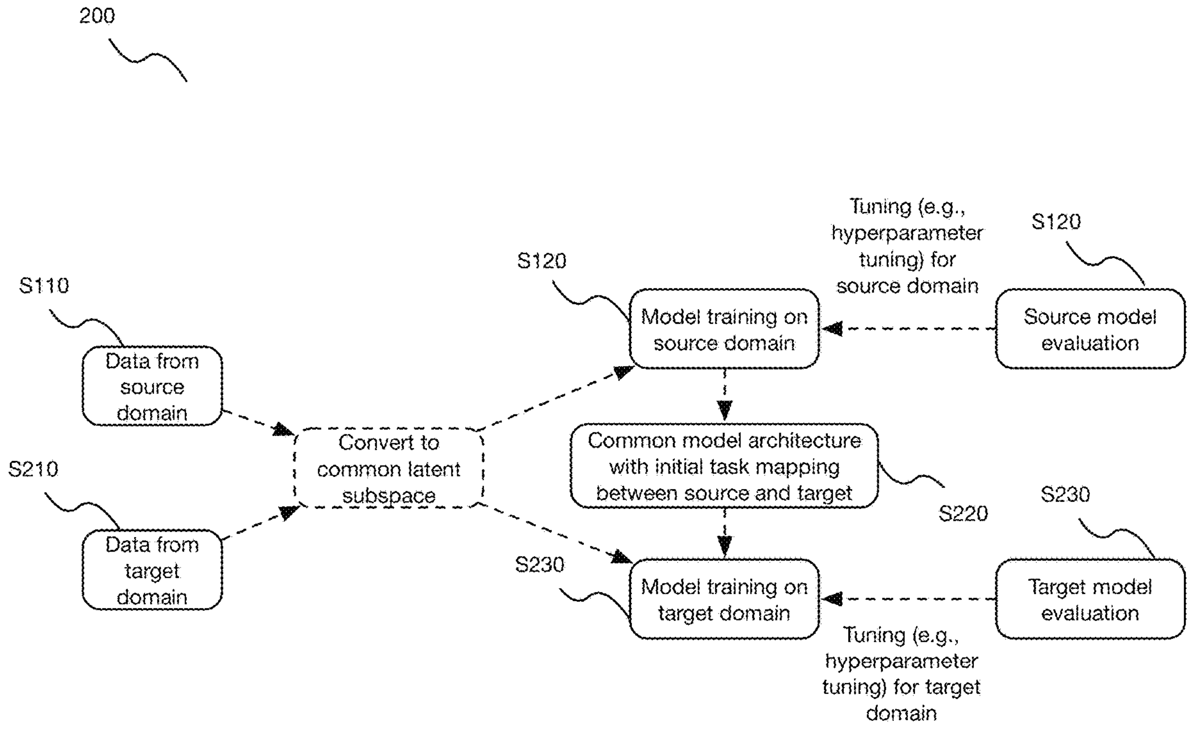
FIG. 6 depicts a schematic variation of a method for expanding the operational design domain of an autonomous agent.

S220 preferably includes comparing tasks of the $2^{nd}$ domain with tasks of the $1^{st}$ domain to determine a mapping (e.g., relationship, overlap, similarity, etc.) between the tasks and/or the domains (e.g., between the source and target domains as shown in FIG. 6), where the mapping preferably functions to identify which tasks of the source domain are relevant to (e.g., can be by utilized by, can be used in a modular fashion to form a target task in, etc.) the target domain. This in turn enables the decision-making architecture to be updated (e.g., though transfer learning) in an efficient and reliable manner (e.g., without negative transfer, without a large amount of data in the $2^{nd}$ domain, etc.), as the most relevant tasks of the source domain can be leveraged to efficiently update the decision-making architecture.

For decision-making architectures that include a first subset of models each trained for a particular context and a second subset of models each trained for a particular action (e.g., resulting from a model of the first subset of models), given the systematic categorization of the models in terms of context and actions, a well-defined mapping between tasks (e.g., context-action pair tasks) can be used to efficiently (e.g., in minimal time, with minimal data, etc.) update the decision-making architecture.

The system and/or method are preferably designed and/or configured to use multiple source tasks (e.g., multiple source models, multiple source models of the same set, etc.), any or all of which can be used, in determining the mapping to a target task. In some variations, for instance, all relevant (e.g., as determined based on shared features) experienced source tasks are leveraged when learning a novel target task. Alternatively, a subset of previously experienced tasks can be used. Which of these variations is implemented preferably depends on knowledge and/or assumptions about the task distribution: if tasks are expected to be similar enough that all past experience is determined and/or presumed to be useful, there may be no need to select a subset. On the other hand, if the distribution of tasks is multi-modal, it is likely that transferring from all tasks is sub-optimal (e.g., inefficient, costly in time and/or computation and/or data, etc.), and a subset can be determined and utilized.

In preferred implementations, S220 is performed for each new model (equivalently referred to herein as an updated model) being produced, such as: for each new deep decision network being produced, for each new deep trajectory network being produced, and/or for any other model being produced. Additionally or alternatively, S220 can be performed for each new domain expansion (e.g., each new route added, each new action requirement for the vehicle, each new context occurrence within one or more routes, each new location of deployment [e.g., with new routes, new weather conditions, new traffic conditions, etc.], etc.), for a set of multiple new models at once (e.g., simultaneously, serially, etc.), and/or at any other time(s).

In a set of variations, for instance, for each new model being produced/developed, a mapping is determined, where the mapping indicates which of a previous set of models are to be used to produce the new model. The mapping is preferably determined based on a similarity between features of the previous set of models and those associated with the objective(s) and/or use(s) of the new model. The previous set of models (equivalently referred to herein as source models) can include any or all of: multiple models, a single model, and/or any number of models. The previous set of models are preferably of the same set of models (e.g., all of the $1^{st}$ set, all of the $2^{nd}$ set, etc.)—additionally or alternatively, source models can come from multiple sets and/or types (e.g., combination of $1^{st}$ and $2^{nd}$ sets).

The mappings are preferably manually determined (e.g., according to a rule-based and/or programmed processed, without a trained model, with human input/feedback, etc.), such as any or all of: with a programmed (e.g., manually determined) process, with a rule-based process, with a lookup table, with a decision tree, with a set of predetermined mapping assignments, with a set of similarity scores between models, with a set of heuristics, with any combination of processes, and/or otherwise determined. This can function, for instance, to prevent and/or minimize the occurrence of negative transfer, as the manual determination of mappings can enable selection of the most relevant (e.g., directly comparable, explainably comparable, modularly related, etc.) models and associated portions of the domain for use in determining new models for new domains.

Additionally or alternatively, any or all of the architecture of the decision-making platform can function to enable precise, relevant mappings to be made between models, such as, but not limited to: the modular nature of the models, the sequential evaluation of the models, and/or volume of models. In some variations, the modular nature and large number of models (e.g., hundreds for the $1^{st}$ domain, thousands for the $1^{st}$ domain, etc.), each with a high specificity (e.g., targeted to a specific context within a specific route, targeted to a specific action within a specific context and/or specific route, etc.), enables the most relevant models to be identified and used (e.g., exclusively used) in producing the new model.

Any number of features between models (and/or associated domains or domain portions) can be determined and/or used in determining the mappings, such as, but not limited to: context features (e.g., number of lanes, types of roads, presence of particular objects within the context [e.g., particular traffic signs, traffic lights, intersections, shoulder, curb, barricade, bike lane, crosswalk, loading dock, etc.], geometry features, types and/or numbers of zones, types of traffic and/or pedestrians and/or cyclists in the context, etc.), such as for producing a new model of the $1^{st}$ set; action features (e.g., action involves a particular direction of travel [e.g., toward the left, toward the right, forward, reverse, etc.], action involves a particular type of maneuver [e.g., slowing down, speeding up, stopping, waiting, merging, crossing on-coming traffic, parking, etc.], action involves monitoring other vehicles [e.g., for right-of-way determinations, etc.], action involves interactions with other types of objects [e.g., other vehicles, pedestrians, cyclists, etc.], etc.), such as for producing a new model of the $2^{nd}$ set; scores associated with any or all of the features (e.g., cost scores, risk scores, similarity scores, closeness/proximity scores, etc.); and/or any other features or information.

Additionally or alternatively, any or all of the mappings can be determined with a trained model and/or algorithm, and/or can be otherwise suitably determined.

Determining the mappings can additionally or alternatively leverage a latent space representation, such as that described above, which can enable efficient, logical, and/or simple mappings to be determined between source and target domain tasks. This can be enabled, for instance, due to the lower-dimension, meaningful and comparable metrics which the latent space representation is able to distill (e.g., from a large amount of detailed data received at the perception subsystem). For instance, when considering transfer learning via dimensionality reduction, a low-dimensional (e.g., relative to the inputs received/determined at the perception module) latent feature space where the distributions between the source domain data and the target domain data are the same or close to each other can confer numerous benefits. Onto this latent feature space, for instance, data in related domains can be projected and a training process applied to train the models (e.g., the $1^{st}$ subset of models, for the $2^{nd}$ subset of models, etc.). As such, the latent feature space can effectively function as a bridge of transferring knowledge from the source domain to the target domain (e.g., and used to determine efficient mappings). A dimensionality reduction process is further preferably implemented when determining the latent space, which minimizes the distance between distributions of the data in different domains in a latent space. This framework can further function to exploit the fact that certain aspects of reward functions are often shared among different (but related) tasks, such as the negative reward an autonomously driven vehicle might receive for stopping too close to an obstacle. As such, variations of the method can optionally assume the reward functions "r(t)" for different tasks are related via a latent basis of reward components "L". These components can be used to reconstruct the true reward functions via a sparse combination of such components with task-specific coefficients s(t), using L as a mechanism for transfer.

In specific examples, latent space representations of data associated with particular models (e.g., data used to train source models, data collected for a new domain/new model, etc.) can be used to calculate proximity metrics and/or conduct proximity checks for determining which source models are similar enough to be used in producing the new model (e.g., similar enough to the objective/use case/context/action/etc. of the new model).

In a first variation of S220, S220 includes determining a new context-based model of the $1^{st}$ set (e.g., deep decision network which determines an action for a specific context), where producing the new context-based model includes determining which of the existing $1^{st}$ set of models to use in S230 based on a shared set of features between contexts of the existing models and features of the new context. Additionally or alternatively, features of the action options which are considered and/or selected by the new model and/or the $1^{st}$ set of models can be further considered and/or compared among models. In a specific example, for instance, a model configured to select an action of executing a right turn (and/or any other actions) in a residential zone can be used to develop a model configured to select an action of executing a right turn (and/or any other actions) in an highway context. In another specific example (e.g., as shown in FIG. 7), one or more models for a $1^{st}$ context of a single lane residential road, one or more models for a $2^{nd}$ context of a one-way residential road, and one or more models for a 3rd context of a parking lot, are selected (e.g., mapped to) a new model being developed for a $4^{th}$ context of a multi-lane residential zone due to similarities among features of these contexts (e.g., residential designations, associated speed limits [e.g., low speeds in both residential zones and parking lots], numbers of lanes, directions of lanes, etc.). Additionally or alternatively, a similarity between available actions associated with the contexts can be utilized in determining the mappings.

In a second variation of S220, S220 includes determining a new action-based model of the $2^{nd}$ set (e.g., deep trajectory network which produces a trajectory for a specific action), where producing the new action-based model includes determining which of the existing $2^{nd}$ set of models to use in S230 based on a shared set of features between actions of the existing models and features of the new action. In a specific example, for instance, an existing model for the action of making a right turn can be used (e.g., with other models, alone, etc.) to produce a model for a new action of lane changing into a far right lane due to a similarity of features between the actions and/or objectives of the actions (e.g., refraining from driving onto a curb proximal to the right lane, refraining from crossing a yellow lane line, refraining from cross a set of solid lane lines, executing a smooth trajectory, etc.). In another specific example, for an action of lane keeping within a new context and/or a new route, other models for lane keeping (e.g., within different contexts, within different routes, etc.) can be used in producing the new model, models for other actions can be used (e.g., left nudge, right nudge, etc.) based on a similarity in action features, and/or any other models or combination of models can be used to produce the new model. In another specific example, an existing model for implementing a creep action (e.g., where the vehicle slows down/stalls briefly to collect more data on what is potentially coming into its path before proceeding) can be used to determine a model for new action of merging (e.g., onto a highway, within a highway context, etc.)—while there are certain differences between these actions and/or contexts (e.g., speeds may be different, environments may be different, etc.), the resulting motions (e.g., trajectories) can have shared features and/or goals (e.g., inclusion of a slowing down motion, inclusion of a gradual angled driving once the path is clear, lane change, etc.).

Additionally or alternatively, S220 can include any other processes and/or be otherwise suitably implemented.

4.23 Method—Updating the Decision-Making Architecture S230

S200 includes updating the decision-making architecture S230 (e.g., as shown in FIG. 3), which functions to expand the ODD associated with the autonomous agent. Additionally or alternatively, S230 can function to enable the vehicle to navigate a new context (e.g., completely new context, previous context within a new route, etc.), execute a new action (e.g., completely new action, previous action within a new context, previous action within the same context within a new route, etc.), execute a new set of routes, and/or otherwise expand the operation and/or usability of the vehicles.

S230 is preferably performed with a transfer learning process (and/or domain adaptation) and based on any or all of the mappings determined in S220, and optionally with any or all of the training processes described in S120, but can additionally or alternatively be performed in response to any other processes of the method 200, and/or at any other time(s).

S230 is further preferably performed based on the decision-making architecture determined in S120, such that the decision-making architecture determined in S230 starts with any or all of: the general model architectures, the model architectures and parameters (e.g., hyperparameters, learned parameters, etc.), the parameters, and/or any other information of the prior decision-making architecture.

The transfer learning process preferably includes the determination and/or refinement (e.g., retraining, updating, adjusting, etc.) of a set of weights associated with the target model(s), but can additionally or alternatively include the determination and/or adjustment of a model architecture (e.g., number of neural network layers, organization of neural network layers, number and/or arrangement of neural network nodes, type of neural network, number of neural networks, etc.) and/or the determination of any other information.

Figure 8:
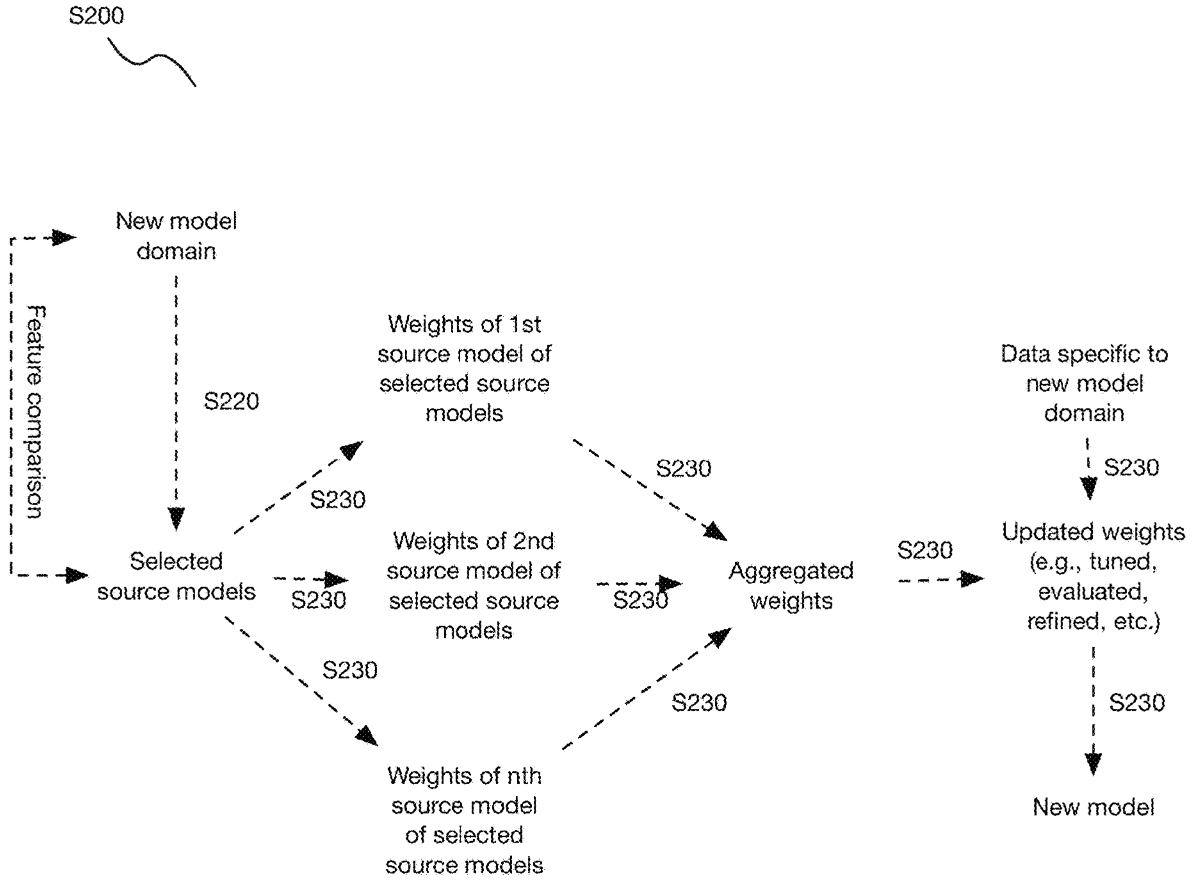
FIG. 8 depicts a variation of the method for expanding the operational design domain of an autonomous agent.

In a preferred set of variations (e.g., as shown in FIG. 8), S230 includes, for determining a new model, any or all of: starting with a common model architecture (e.g., basic model framework shared among all of the $1^{st}$ set of models, basic model framework shared among all of the $2^{nd}$ set of models, modified framework, etc.); retrieving a set of source models based on the mapping performed in S220; aggregating (e.g., according to an algorithm, model, equation, mathematical operation [e.g., summing, averaging, calculating the median of, calculating the minimum of, calculating the maximum of, etc.], finding a weighted average using hand tuning, finding a weighted average through Gradient descent-based optimization, approximate sampling from the posteriors of the model weights of any individual context-action pairs using isotropic Gaussian approximation and/or approximating a precision matrix using Fisher information, etc.) weights of the retrieved set of models to form an initial set of weights for the new model; and refining the initial set of weights for the new model based on training (e.g., re-training, updating, etc.) the new model with data specific to the new model (e.g., data collected [e.g., from sensors of the vehicle] within the specific route and context associated with the model, data collected while the vehicle is executing the specific action, data collected from sensors with the same level of degradation as the model is configured for, etc.). Additionally or alternatively, S230 can include any other suitable processes.

Refining the initial set of weights (e.g., during training, re-training, etc.) preferably includes target model evaluation and tuning processes (e.g., providing the model new data which is represented in a latent space representation and tuning the model while evaluating its performance), but can additionally or alternatively include any other processes.

Additionally or alternatively, S230 can include a hyperparameter tuning process (e.g., as described above, based on the $2^{nd}$ set of inputs, etc.), and additionally or alternatively any other processes.

S230 preferably takes less time and/or is performed with less data as compared to S120, but can alternatively be performed in any other time and/or with any other data.

Additionally or alternatively, S230 can include any other processes.

4.3 Method—Implementing the Decision-Making Architecture S300

The method 200 can optionally include implementing the decision-making architecture 300, which functions to operate (e.g., maneuver) the autonomous agent according to the decision-making architecture. S300 can additionally or alternatively function to enable operation of the vehicle within the new and/or expanded domains (e.g., along a new set of fixed routes, within new contexts, while executing new actions, etc.).

The decision-making architecture implemented in S300 can include that determined in S100, that determined in S200 and/or any repeated iterations, a combination of architectures, and/or any other decision-making architecture.

5. Variations

In one variation of the method, such as for use of the method in developing a new deep decision network (e.g., as described above), the method is used to enable the decision-making process learned through an Inverse Reinforcement Learning (IRL) process in a first domain to be adapted for use in a second domain, where the decision making is configured to produce (e.g., output) an optimal policy that outputs a particular action given a particular vehicle state of the vehicle. The policy preferably refers to (e.g., includes) the suggested actions that the vehicle should take for every possible vehicle state.

In a specific example with inverse reinforcement learning, where the goal is to obtain (e.g., produce) a reward function based on state-action pairs (e.g., from human driving data, from simulated data, from data collected onboard an autonomous vehicle, from a combination of data sources/types, etc.), data is first collected from a set of source domains including at least a $1^{st}$ domain, and the parameters (e.g., weights) of the reward function(s) are learned to represent the training samples associated with the source domain datasets. In a particular specific example, for instance, this model is configured to determine a policy (e.g., at any given time) based on any or all of: a set of internal states (e.g., collectively defining a state space) produced with a latent space representation for the vehicle; the set of actions that the vehicle can take (e.g., turning right, turning left, changing lanes, stopping, yielding, etc.); a transformation (e.g., matrix) representing a probability of transitioning from one state to another (e.g., matrix containing the probability of transitioning from one state to another thereby representing the potential modifications that can occur to the state of an agent in response to performing an action); and a reward function for the vehicle (e.g., that produces a reward value in response to the state of the agent). This reward function determination process can optionally be followed with a Reinforcement Learning (RL) process (e.g., training process) that is configured to produce the optimal policy as output. To use these learnings in a new domain—referred to as a $2^{nd}$ domain—the following processes are preferably performed: collecting data from the $2^{nd}$ domain; initializing the new deep decision network parameters (reward function parameters) (e.g., weights) based on the parameters learned from the source domains using aggregated model parameters (e.g., weighted average parameters) from multiple contexts and actions (e.g., through hand tuning, Gradient descent-based optimization, etc.) and/or approximate sampling (e.g., isotropic Gaussian approximation, Fisher information matrix approximation, etc.) from parameters (e.g., posteriors of model weights) of any context-action pairs (e.g., from the deep decision network associated with the source domains);

further training these initial parameters based on data from the $2^{nd}$ domain; initializing a policy for RL training by creating a composite policy (e.g., additive, multiplicative, etc.), where the composite policy includes a weighted sum of distributions from the source domain policies, where a function (e.g., gating function) can be determined and/or used to compute the parameter values (e.g., weight values that determine the probability of activating each source domain for a given vehicle state); and performing a RL re-training session using data from the $2^{nd}$ domain to obtain the optimal policy for the $2^{nd}$ domain.

Additionally or alternatively, this variation and/or example (and/or modified versions) can be applied to models other than deep decision networks (e.g., deep trajectory networks), the method can be otherwise implemented (e.g., without IRL, with a training process other than IRL and/or RL, etc.), and/or the method can be otherwise suitably performed.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-public transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-public transitory computer readable media, or any suitable device. The computer-executable component can include a computing system and/or processing system (e.g., including one or more collocated or distributed, remote or local processors) connected to the non-public transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising:

determining a first set of action models specific to a first route, wherein each action model is associated with a primary context and is configured to determine an autonomous vehicle action based on environmental information;

generating a second set of action models specific to a second route, comprising, for a set of secondary contexts associated with the second route:

identifying a subset of action models from the first set of action models, wherein the primary context of each of the subset of action models is associated with a primary context similar to a secondary context within the set of secondary contexts;

aggregating model weights from the subset of action models; and refining the aggregated model weights based on measurements of the second route to generate the second set of action models; and operating an autonomous vehicle based on the second set of action models.

2. The method of claim 1, wherein generating a secondary action model within the second set of action models comprises:

determining a secondary context within the set of secondary contexts that does not match any of the primary contexts associated with the first set of action models;

identifying multiple action models from the first set of action models, each associated with primary contexts similar to the secondary context;

aggregating the model weights from the multiple action models; and refining the aggregated model weights from the multiple action models based on the measurements of the second route to generate the secondary action model.

3. The method of claim 1, wherein the model weights are aggregated using a weighted average.

4. The method of claim 1, further comprising:

determining a first set of trajectory models specific to the first route, wherein each of the first set of trajectory models are configured to determine a trajectory of the autonomous vehicle based on an autonomous vehicle (AV) action output by at least one of the first set of action models; and generating a second set of trajectory models specific to the second route, comprising:

determining a secondary set of actions associated with the second route;

identifying a subset of trajectory models from the first set of trajectory models, wherein each of the subset of trajectory models are associated with AV actions similar to the secondary set of actions;

aggregating weights from the subset of trajectory models; and refining the aggregated weights from the subset of trajectory models based on the measurements of the second route.

5. The method of claim 4, wherein operating the autonomous vehicle comprises:

sampling sensor data while traversing along the second route;

determining an action using the second set of action models based on the sensor data;

selecting an action-specific trajectory model from the second set of trajectory models based on the action;

determining a trajectory using the action-specific trajectory model based on the sensor data; and operating according to the trajectory.

6. The method of claim 1, wherein each primary context is associated with a primary set of features; wherein each secondary context is associated with a secondary set of features; and wherein the subset of action models is identified based on a similarity score between the primary set of features and the secondary set of features.

7. The method of claim 6, wherein the primary set of features and the secondary set of features each comprise embeddings in a latent space.

8. The method of claim 1, wherein each primary context and each secondary context comprises values for at least one of: number of lanes, road features, or traffic types.

9. The method of claim 1, wherein the second route comprises a set of geolocations, wherein each geolocation is assigned a secondary context of the set of secondary contexts, and wherein operating the autonomous vehicle comprises:

determining the secondary context associated with a geolocation of the autonomous vehicle;

selecting an action model from the second set of action models based on the secondary context;

determining an action using the selected action model; and operating the autonomous vehicle based on the action.

10. The method of claim 1, wherein the first route and the second route are fixed routes.

11. The method of claim 1, further comprising determining a new action model for a new action that is unsupported by the first set of action models, comprising:

identifying a second subset of action models from the first set of action models, based on a similarity between action features for actions supported by the respective action model and action features for the new action;

aggregating a second set of model weights from the second subset of action models; and generating the new action model for the new action based on the second set of aggregated model weights.

12. The method of claim 11, wherein the action features comprise machine learning embeddings in a latent space.

13. The method of claim 1, wherein each action model comprises a deep neural network (DNN).

14. The method of claim 1, wherein the second route is:

associated with a delivery use case of the autonomous vehicle; and extends between at least two of:

a set of distribution centers;

a set of warehouses; or a set of retailers.

* * * * *